(12) United States Patent
Zhang

(10) Patent No.: US 12,480,594 B2
(45) Date of Patent: Nov. 25, 2025

(54) ELECTROMAGNETIC CONTROL DEVICE AND GAS VALVE HAVING SAME

(71) Applicant: ZHEJIANG SANHUA INTELLIGENT CONTROLS CO., LTD., Zhejiang (CN)

(72) Inventor: Zhansheng Zhang, Zhejiang (CN)

(73) Assignee: ZHEJIANG SANHUA INTELLIGENT CONTROLS CO., LTD., Zhejiang (CN)

( * ) Notice: Subject to any disclaimer, the term of this patent is extended or adjusted under 35 U.S.C. 154(b) by 319 days.

(21) Appl. No.: 18/272,108

(22) PCT Filed: Nov. 16, 2021

(86) PCT No.: PCT/CN2021/130852
§ 371 (c)(1),
(2) Date: Jul. 13, 2023

(87) PCT Pub. No.: WO2022/151831
PCT Pub. Date: Jul. 21, 2022

(65) Prior Publication Data
US 2023/0407985 A1    Dec. 21, 2023

(30) Foreign Application Priority Data
Jan. 13, 2021  (CN) .......................... 202110044993.2

(51) Int. Cl.
*F16K 31/06* (2006.01)
*F16K 1/38* (2006.01)
*F16K 31/385* (2006.01)

(52) U.S. Cl.
CPC ............ *F16K 31/0655* (2013.01); *F16K 1/38* (2013.01); *F16K 31/0693* (2013.01); *F16K 31/385* (2013.01)

(58) Field of Classification Search
CPC .... F16K 31/0655; F16K 1/38; F16K 31/0693; F16K 31/385; F16K 27/029; F16K 31/0696
See application file for complete search history.

(56) References Cited

U.S. PATENT DOCUMENTS 2,725,915 A * 12/1955 Johnson .................. F16B 39/34
                                                       411/302
4,311,170 A *  1/1982 Dolan ....................... F16K 1/38
                                                       251/121

(Continued)

FOREIGN PATENT DOCUMENTS

CN         1293310 A    5/2001
CN       201588991 U    9/2010

(Continued)

OTHER PUBLICATIONS

International Search Report for PCT/CN2021/130852 mailed Jan. 28, 2022, ISA/CN.

*Primary Examiner* — Umashankar Venkatesan
(74) *Attorney, Agent, or Firm* — Yue (Robert) Xu; Apex Attorneys at Law, LLP

(57) ABSTRACT

An electromagnetic control device and a gas valve are provided. The electromagnetic control device includes a sealing head, a sleeve, a first regulating part and a second regulating part. The sealing head is fixedly connected with the sleeve, a part of the sealing head is located inside the sleeve; the sealing head includes a first internal threaded portion, and the first regulating part includes a first external threaded portion; the first regulating part further includes a second internal threaded portion, the second regulating part includes a second external threaded portion. The electromagnetic control device further includes a damping part, the damping part is arranged between a threaded connection structure between the first regulating part and the sealing (Continued)

head, and the damping part is connected to one of the first regulating part and the sealing head.

18 Claims, 7 Drawing Sheets

(56) References Cited

U.S. PATENT DOCUMENTS

| | | | | |
|---|---|---|---|---|
| 4,807,847 | A * | 2/1989 | Martz | F16K 1/38 251/351 |
| 5,141,027 | A * | 8/1992 | Magnasco | F16K 1/52 137/614.17 |
| 6,439,262 | B1 | 8/2002 | Hosono et al. | |
| 6,604,538 | B2 * | 8/2003 | Schmotzer | G05D 7/0106 137/66 |
| 6,679,475 | B2 * | 1/2004 | Rembold | F02M 63/0036 251/129.14 |
| 7,025,552 | B2 * | 4/2006 | Grubert | F16B 5/025 411/546 |
| 7,341,236 | B2 * | 3/2008 | Stephenson | G05D 16/2022 251/38 |
| 7,703,744 | B2 * | 4/2010 | Wagner | F16K 31/0693 251/129.15 |
| 9,631,665 | B2 * | 4/2017 | Fahy | F16B 39/34 |
| 9,810,429 | B2 * | 11/2017 | Vrolijk | F23D 14/36 |
| 10,152,065 | B2 * | 12/2018 | Ok | G05D 16/0663 |
| 10,208,870 | B1 * | 2/2019 | Huang | F16K 31/0655 |
| 12,214,388 | B2 * | 2/2025 | Reeves | B08B 9/0325 |
| 2001/0002595 | A1 * | 6/2001 | Pappalardo | F23N 1/007 137/65 |
| 2003/0000579 | A1 * | 1/2003 | Schmotzer | G05D 7/0106 137/488 |

FOREIGN PATENT DOCUMENTS

| | | |
|---|---|---|
| CN | 105937643 A | 9/2016 |
| CN | 106481866 A | 3/2017 |
| CN | 206092649 U | 4/2017 |

* cited by examiner

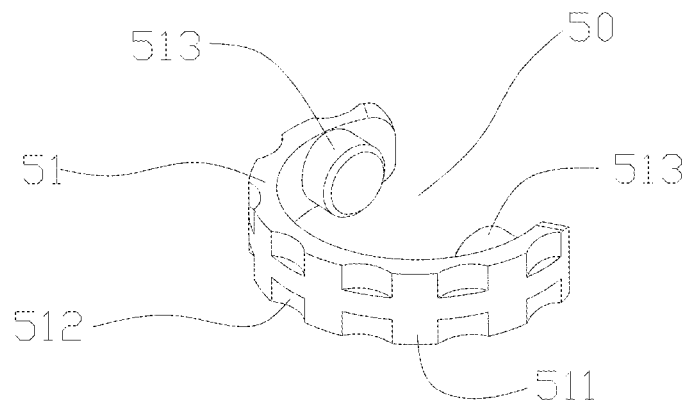
FIG. 5
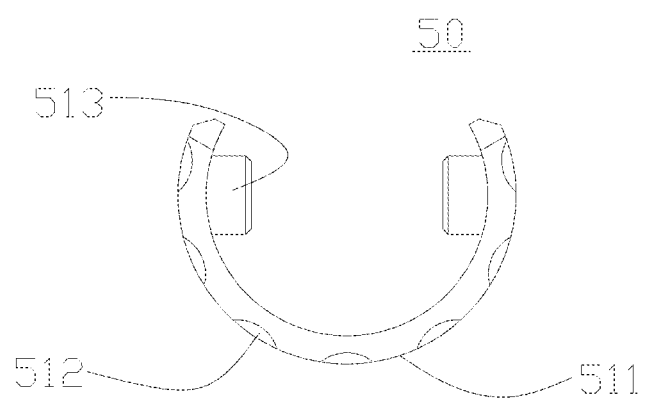
FIG. 6
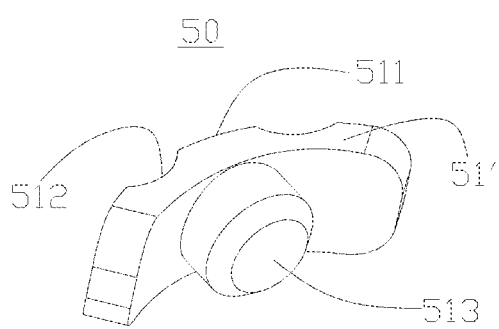
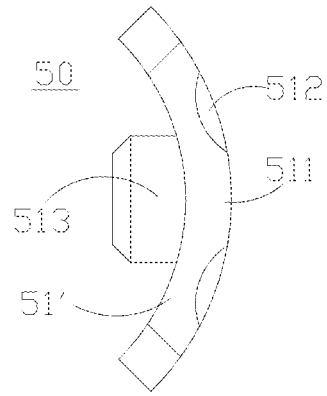
FIG. 7  FIG. 8

ELECTROMAGNETIC CONTROL DEVICE AND GAS VALVE HAVING SAME

This application is a national phase application of International Application No. PCT/CN2021/130852, filed on Nov. 16, 2021, which claims the priority to Chinese Patent Application No. 202110044993.2, titled "ELECTROMAGNETIC CONTROL DEVICE AND GAS VALVE WITH THE SAME", filed on Jan. 13, 2021 with the China National Intellectual Property Administration, which are incorporated herein by reference in their entireties.

FIELD

The present application relates to the technical field of electromagnetic control, and, in particular, to an electromagnetic control device and a gas valve with the electromagnetic control device.

BACKGROUND

A gas proportional valve includes a proportion regulating device, which includes a regulating mechanism, a threaded engaging member and a regulating rod. An external threaded portion of the regulating mechanism is in threaded engagement with an internal threaded portion of the threaded engaging member. The regulating mechanism is movable axially up and down relative to the threaded engaging member under action of the threaded engagement, so as to achieve a further regulation for the gas flow in a case that an outlet pressure of the gas proportional valve is in a high pressure state. An external threaded portion of the regulating rod is in threaded engagement with an internal threaded portion of the regulating mechanism. Similarly, the regulating rod is movable axially up and down relative to the regulating mechanism under action of the threaded engaging, so as to achieve a further regulation for the gas flow in a case that the outlet pressure of the gas proportional valve is in a low pressure state. It is required to minimize the possibility of loosening of parts under affection of external vibration, or the like.

SUMMARY

The objective of the present application is to provide a gas valve, in which a damping part is provided at a regulating position of a pressure regulating part of an electromagnetic control device and the position of the pressure regulating part is limited by using the damping of the damping part, thereby achieving a good anti-loosening effect.

In order to solve the above technical problem, an electromagnetic control device is provided according to the present application. The electromagnetic control device includes a sealing head, a sleeve, a first regulating part and a second regulating part. The sealing head is fixedly connected with the sleeve, and a part of the sealing head is located inside the sleeve. The sealing head includes a first internal threaded portion, and the first regulating part includes a first external threaded portion, where the first internal threaded portion is in threaded engagement with the first external threaded portion. The first regulating part further includes a second internal threaded portion, the second regulating part includes a second external threaded portion, and the second internal threaded portion is in threaded engagement with the second external threaded portion.

The electromagnetic control device further includes a damping part, which is arranged in a threaded connection structure between the first regulating part and the sealing head. The damping part is connected to one of the first regulating part and the sealing head, and an outer peripheral portion of the damping part abuts against one of the first internal threaded portion and the first external threaded portion; and/or the damping part is arranged in a threaded connection structure between the first regulating part and the second regulating part. The damping part is connected to one of the first regulating part and the second regulating part, and the outer peripheral portion of the damping part abuts against one of the second internal threaded portion and the second external threaded portion.

The electromagnetic control device is applied in a gas valve, the first regulating part is in thread connection with the sealing head for regulating in a high-pressure state, and the second regulating part is in thread connection with the first regulating part for regulating in a low-pressure state. The electromagnetic control device is provided with the damping part, so that a damping can be formed either between the threaded connection structure between the first regulating part and the sealing head or between the threaded connection structure between the first regulating part and the second regulating part. Under action of the damping provided by the damping part, the connection structure between related pressure regulating parts is not easy to loosen, and the anti-loosening effect is relatively good. Therefore, a pressure regulating range of the gas valve can be well determined, and the possibility that the pressure regulating range changes due to the position change of the related pressure regulating parts can be reduced.

According to the foregoing electromagnetic control device, the damping part includes a first damping portion, and at least a part of the first damping portion is located between an inner peripheral wall of the sealing head and an outer peripheral wall of the first regulating part. The threaded connection structure between the first regulating part and the sealing head is configured to squeeze a part, between the inner peripheral wall of the sealing head and the outer peripheral wall of the first regulating part, of the first damping portion by rotation of the first regulating part, to form damping; and/or the damping part includes a second damping portion, and at least a part of the second damping portion is located between an inner peripheral wall of the first regulating part and an outer peripheral wall of the second regulating part. The threaded connection structure between the second regulating part and the first regulating part is configured to squeeze a part, between the inner peripheral wall of the first regulating part and the outer peripheral wall of the second regulating part, of the second damping portion by rotation of the second regulating part, to form damping.

According to the foregoing electromagnetic control device, a set space for movement of the part, between the inner peripheral wall of the sealing head and the outer peripheral wall of the first regulating part, of the first damping portion is provided in a circumferential direction of the first regulating part, to prevent the threaded connection structure between the first regulating part and the sealing head from being stuck; and/or a set space for movement of the part, between the inner peripheral wall of the first regulating part and the outer peripheral wall of the second regulating part, of the second damping portion is provided in a circumferential direction of the second regulating part, to prevent the threaded connection structure between the first regulating part and the second regulating part from being stuck.

According to the foregoing electromagnetic control device, the first regulating part includes a tube body portion, the first external threaded portion in threaded engagement with the sealing head is provided on an outer peripheral wall of the tube body portion, and the outer peripheral wall of the tube body portion is provided with a groove portion. The damping part includes at least one first main body member, the first main body member is arranged in the groove portion and is fixed to the tube body portion. The first main body member includes at least one convex portion, the at least one convex portion at least partially protrudes from the outer peripheral wall of the tube body portion. The first damping portion includes the convex portion.

According to the foregoing electromagnetic control device, the first main body member is of an arc-shaped structure, and the groove portion extends along a circumferential direction of the tube body portion. The first main body member is provided with at least one convex portion and at least one concave portion along a circumferential direction of the first main body member, where the convex portion and the concave portion are arranged adjacent to each other. The threaded connection structure between the sealing head and the first regulating part is configured to push each of the at least one convex portion to a corresponding one, adjacent to the convex portion, of the at least one concave portion by rotation of the first regulating part. The first damping portion includes the convex portion and the concave portion.

According to foregoing the electromagnetic control device, a bottom of the groove portion of the tube body portion is provided with at least one hole portion extending through a bottom wall of the groove portion. The damping part further includes at least one boss, and the at least one boss is fixedly arranged on an inner wall of the first main body member and embedded in the hole portion.

According to the foregoing electromagnetic control device, the hole portion is in a form of a through hole. The hole portion further extends through an inner peripheral wall of the tube body portion, the at least one boss protrudes from the inner peripheral wall of the tube body portion, the inner peripheral wall of the tube body portion is provided with internal threads in threaded engagement with the second regulating part. The second damping portion includes the at least one boss.

According to the foregoing electromagnetic control device, a radian of the first main body member is less than 180 degrees, only one boss is fixedly arranged on the first main body member, and the boss is located at a middle position of the first main body member; or a radian of the first main body member is greater than 180 degrees, and at least two bosses are fixedly arranged on the first main body member, where two of the at least two bosses are arranged at two ends of the first main body member, respectively.

According to the foregoing electromagnetic control device, the sealing head includes a sealing head main body portion fixedly inserted into the sleeve. The sealing head main body portion includes the first internal threaded portion, and an outer peripheral wall of the sealing head main body portion is provided with a mounting groove portion. The damping part includes at least one first main body member, and the first main body member is arranged at the mounting groove portion and is fixed to the sealing head main body portion. At least one protrusion portion is fixedly arranged on the first main body member, a bottom wall of the mounting groove portion is provided with a through hole fitted with the protrusion portion, the protrusion portion passes through the through hole and abuts against the first external threaded portion. The first damping portion includes the protrusion portion.

According to the foregoing electromagnetic control device, the damping part further includes at least one second main body member, and the second main body member is arranged separately from the first main body member.

The inner peripheral wall of the first regulating part is provided with a first mounting cavity portion, and the second main body member is fixedly embedded in the mounting cavity portion and protrudes from the inner peripheral wall of the first regulating part. Alternatively, the outer peripheral wall of the second regulating part is provided with a second mounting cavity portion, and the second main body member is fixedly embedded in the second mounting cavity portion and protrudes from the outer peripheral wall of the second regulating part.

The second damping portion includes the second main body member.

According to the foregoing electromagnetic control device, the second main body member is of a substantially cylindrical structure.

According to the foregoing electromagnetic control device, the damping part further comprises at least one second main body member, and the second main body member is arranged separately from the first main body member.

A peripheral wall of the second regulating part is provided with a through-hole portion, the through-hole portion includes two through-hole structures arranged along a radial direction of the second regulating part. The second main body member is arranged at the through-hole portion and is fixed to the second regulating part. Each of two ends of the second main body member passes through a corresponding one of the two through-hole structures and abuts against the second internal threaded portion.

According to the foregoing electromagnetic control device, the damping part is a plastic part.

According to the foregoing electromagnetic control device, the sealing head includes a sealing head main body portion and a jacket portion, where an outer diameter of the jacket portion is larger than that of the sealing head main body portion. A downward stepped face is formed at a joint of the jacket portion and the sealing head main body portion, and the stepped face abuts against an end surface of the sleeve. The first regulating part includes a regulating head for rotary regulation, and the regulating head is located in the jacket portion.

A gas valve is further provided according to the present application. The gas valve includes the foregoing electromagnetic control device.

Since the electromagnetic control device has the above technical effect, the gas valve including the electromagnetic control device also has the same technical effect, which will not be repeated here.

BRIEF DESCRIPTION OF THE DRAWINGS

FIG. 5 is a schematic structural view of the damping part shown in FIG. 3;

FIG. 6 is a schematic structural view of the damping part shown in FIG. 5 from another perspective;

FIG. 7 is a schematic structural view of a damping part according to another embodiment of the present application;

FIG. 8 is a schematic structural view of the damping part shown in FIG. 7 from another perspective;

Figure 1:
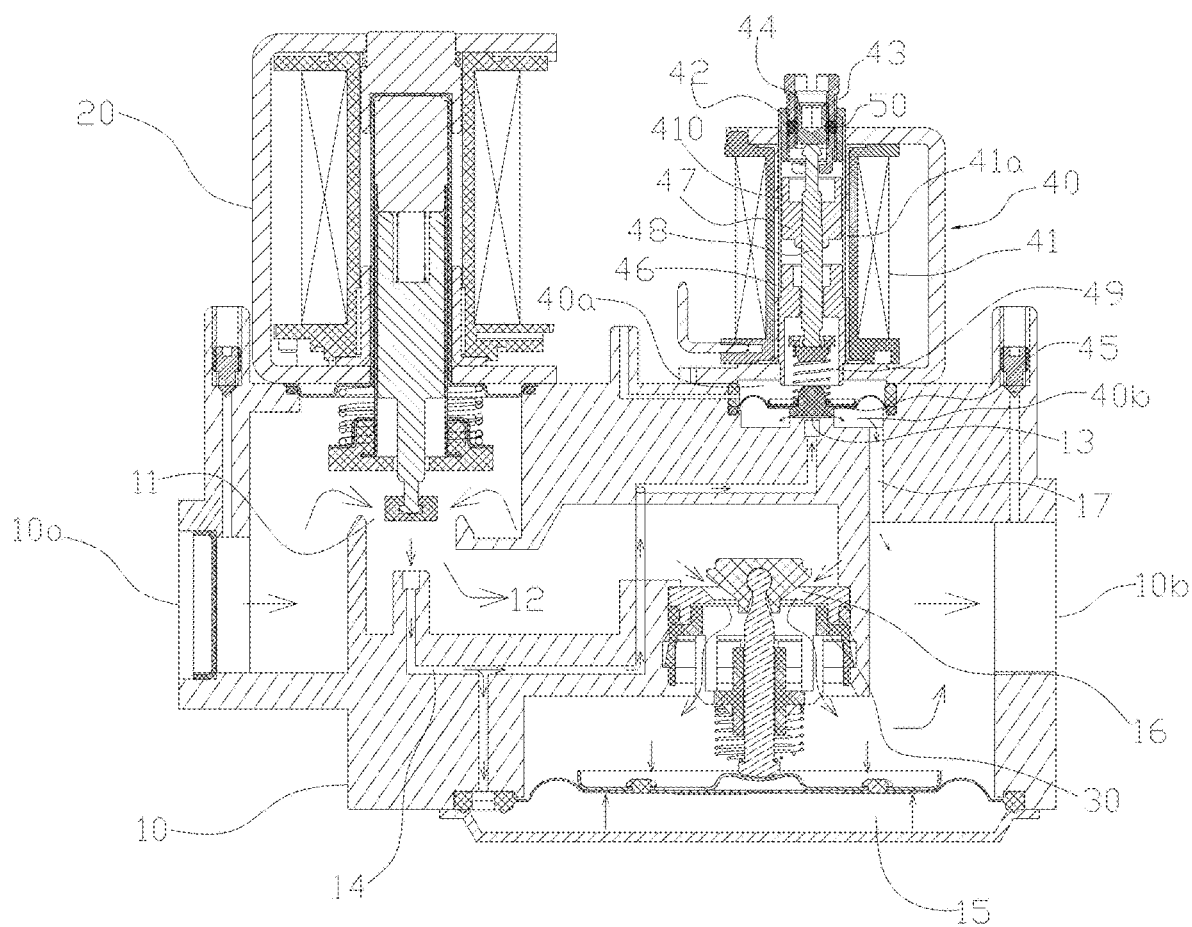
FIG. 1 is a schematic sectional view of a gas valve according to an embodiment of the present application.

Reference Numerals in the Drawings are listed as Follows:

| | |
|---|---|
| 10, valve body; | 10a, inlet; |
| 10b, outlet | 11, first valve port; |
| 12, second valve port; | 13, proportional regulating valve port; |
| 14, gas flow channel; | 15, back pressure cavity; |
| 16, main valve port; | 17, pressure releasing channel; |
| 20, electromagnetic control device; | 30, differential pressure regulating device; |
| 40, electromagnetic control device; | 40a, upper cavity; |
| 40b, lower cavity; | 41, coil part; |
| 41a, through hole; | 42, sealing head; |
| 421, sealing head main body portion; | 4211, mounting groove portion; |
| 422, jacket portion; | 423, stepped face; |
| 43, first regulating part; | 431, tube body portion; |
| 432, groove portion; | 433, hole portion; |
| 434, limiting portion; | 4341, limiting face portion; |
| 435, opening; | 436, regulating head; |
| 44, second regulating part; | 441, mounting cavity portion; |
| 45, diaphragm member; | 46, static iron core; |
| 47, movable iron core; | 48, valve rod; |
| 481, limiting stepped face; | 49, elastic part; |
| 410, sleeve; | S1, first threaded connection structure; |
| S2, second threaded connection structure; | |
| 50, damping part; | 51, 51', 51", first main body member; |
| 511, convex portion; | 512, concave portion; |
| 513, boss; | 514", protrusion portion; |
| 52, 52', second main body member. | |

DETAILED DESCRIPTION OF THE EMBODIMENTS

In order to enable those skilled in the art to better understand the technical solutions of the present application, the present application will be further described in detail in conjunction with the drawings and specific embodiments.

For convenience of understanding and conciseness of description, an electromagnetic control device and a gas valve with the electromagnetic control device are described in combination hereinafter, and the beneficial effects will not be repeated.

Figure 2:
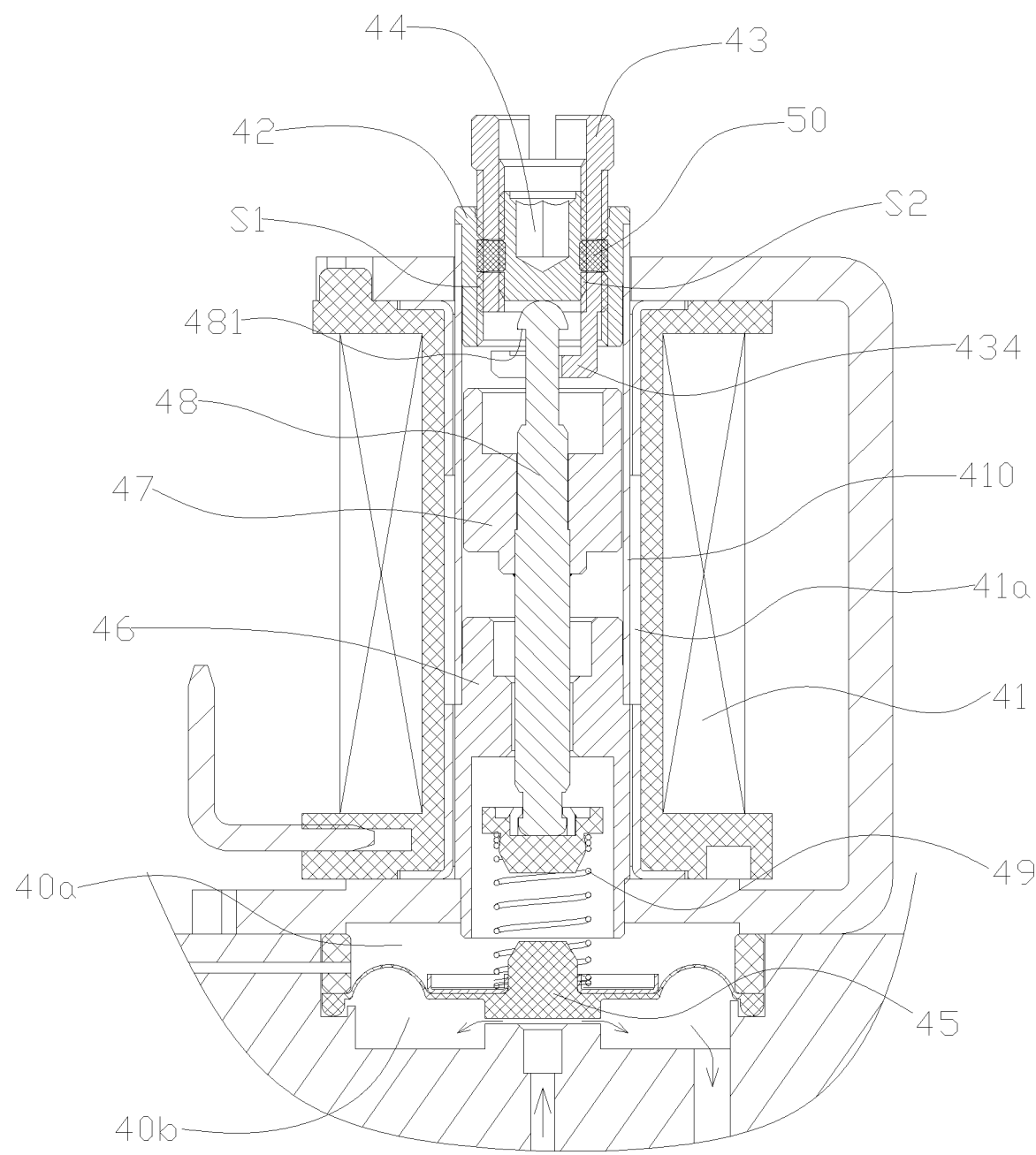
FIG. 2 is a partially enlarged view of the gas valve shown in FIG. 1 at a position of an electromagnetic control device.

With reference to FIG. 1 and FIG. 2, FIG. 1 is a schematic sectional view of a gas valve according to an embodiment of the present application, and FIG. 2 is a partially enlarged view of the gas valve shown in FIG. 1 at a position of an electromagnetic control device.

As shown, the gas valve includes a valve body 10 having an inlet 10a and an outlet 10b. The gas flows from the inlet 10a and through the outlet 10b to a combustion chamber.

The valve body 10 is connected with an electromagnetic control device 20, a differential pressure regulating device 30 and an electromagnetic control device 40. The valve body 10 further includes a first valve port 11, a second valve port 12, a proportional regulating valve port 13 and a main valve port 16. The second valve port 12 and the first valve port 11 are arranged at corresponding positions, the second valve port 12 is located below the first valve port 11, and both the first valve port 11 and the second valve port 12 are controlled to be opened or closed by the electromagnetic control device 20. The electromagnetic control device 40 is configured to regulate the opening of the proportional regulating valve port 13 to regulate the pressure of a back pressure cavity 15 of the differential pressure regulating device 30, so as to control the differential pressure regulating device 30 to open the main valve port 16 and to control the regulation of the opening of the main valve port 16. That is, the electromagnetic control device 40 and the differential pressure regulating device 30 perform a function of the gas flow regulation.

The valve body 10 has a gas flow channel 14. The gas flow channel 14 is divided into two branches with one being communicated with the back pressure cavity 15, and the other being communicated with the proportional regulating valve port 13. The electromagnetic control device has a proportional regulating diaphragm cavity, which can be specifically divided into an upper cavity 40a located above a diaphragm member 45 and a lower cavity 40b located below the diaphragm member 45. The upper cavity 40a may be connected to a wind pressure pipe to regulate the pressure in the upper cavity 40a, and the lower cavity 40b is communicated with the gas flow channel 14 through the proportional regulating valve port 13. The valve body 10 further includes a pressure releasing channel 17 through which the lower cavity 40b is in communication with the outlet 10b.

The electromagnetic control device 40 further includes an elastic part 49 pressed against the diaphragm member 45. During operation, the diaphragm member 45 is subjected to an elastic force of the elastic part 49, a pressure of the upper cavity 40a and a pressure of the lower cavity Under the action of these forces, the diaphragm member 45 is able to change the opening of the proportional regulating valve port 13, which acts on the back pressure cavity 15 through the gas flow channel 14, thereby regulating the opening of the main valve port 16.

The magnitude of the elastic force of the elastic part 49 of the electromagnetic control device 40 affects a pressure at the outlet of the electromagnetic control device 40, and thus affects the regulation of the pressure of the back pressure cavity 15, thereby affecting the regulation of the opening of the main valve port 16.

In the setting, a compression force of the elastic part 49 of the electromagnetic control device 40 is regulated to set a minimum outlet pressure and a maximum outlet pressure of the valve body, to form a pressure regulating range. In practice, stepless regulation of the set pressure range can be achieved by providing constant current direct current through the electromagnetic control device 40, or two-step pressure regulation can be achieved by controlling the on/off of the electromagnetic control device 40.

As shown in FIG. 1, the electromagnetic control device 40 includes a coil part 41, a sealing head 42, a first regulating part 43 and a second regulating part 44. The first regulating part 43 is used for regulating in a high pressure state and the second regulating part 44 is used for regulating in a low pressure state. Apparently, the high pressure and the low pressure here are relative concepts.

The coil part 41 is provided with a through hole 41a, and the coil part 4 includes a first wall and a second wall arranged opposite to each other. In the illustrated orientation, the first wall and the second wall are an upper end wall and a lower end wall of the coil part 41, respectively, and the through hole 41a extends through the upper end wall and the lower end wall of the coil part 41.

At least part of the sealing head 42 is fixedly inserted in the through hole 41a and is arranged near the upper end wall of the coil part 41. The first regulating part 43 is sleeved inside the sealing head 42, and the second regulating part 44 is sleeved inside the first regulating part 43.

The first regulating part 43 is connected to the sealing head 42 through threads to adjust a relative position of the first regulating part 43 in an axial direction of the through hole 41a, and the second regulating part 44 is connected to the first regulating part 43 through threads to adjust a relative position of the second regulating part 44 in the axial direction of the through hole.

As shown in FIG. 2, a first threaded connection structure S1 is arranged between the first regulating part 43 and the sealing head 42, and a second threaded connection structure S2 is arranged between the second regulating part 44 and the first regulating part 43.

The electromagnetic control device 40 further includes a static iron core 46, a movable iron core 47, a valve rod 48 and a sleeve 410. At least a part of the static iron core 46 is fixed in the through hole 41a and is arranged near the lower end wall of the coil part 41. At least a part of the sleeve 410 is fixedly inserted in the through hole 41a, and at least a part of the static iron core 46 is fixedly inserted in the sleeve 410.

The movable iron core 47 is located in the sleeve 410 and is movable along the axis of the sleeve 410 to be close to or away from the static iron core 46. The valve rod 48 is fixedly inserted in the movable iron core 47, a upper end of the valve rod 48 passes through the movable iron core 47 and cooperates with the first regulating part 43 and the second regulating part 44, and a lower end of the valve rod 48 passes through the static iron core 46 and abuts against the elastic part 49, that is, the elastic part 49 is arranged between the valve rod 48 and the diaphragm member 45. The valve rod 48 is in a sliding fit with the static iron core 46, that is, the valve rod 48 can be in a sliding fit relative to the static iron core 46 when the valve rod 48 moves along with the movable iron core 47 in the axial direction of the through hole 41a, so as to regulate the compression force of the elastic part 49.

In the illustrated embodiment, an upper end portion of the sleeve 410 extends beyond an upper end face of the coil part 40, and the sealing head 42 is fixedly inserted in the sleeve 410.

Specifically, the lower end of the first regulating part 43 has a limiting portion 434 fitted with the upper end of the valve rod 48. The upper end of the valve rod 48 passes through the limiting portion 434 and has a downward limiting stepped face 481, and the limiting portion 434 has an upward limiting face portion 4341 fitted with the limiting stepped face 481. It can be understood that when the valve rod 48, relative to the limiting portion 434, moves down until the limiting stepped face 481 abuts against the limiting face portion 4341, the valve rod 48 cannot continue to move down. In this way, the axial downward position of the valve rod 48 can be adjusted by regulating the axial position of the first regulating part 43 in the through hole 41a, and thus a limit elastic force of the elastic part 49 can be restricted, to realize the regulation for the high pressure in the pressure regulating range.

Specifically, the lower end of the second regulating part 44 abuts against the upper end of the valve rod 48, which limits the position of the valve rod 48 moving upward in the axial direction of the through hole 41a under the action of an elastic restoring force of the elastic part 49. That is, the position of the valve rod 48 moving upward in the axial direction can be adjusted by regulating the axial position of the second regulating part 44 in the through hole 41a. In this way, another limit elastic force of the elastic part 49 can be restricted to realize the regulation for the low pressure in the pressure regulating range.

As described above, the position of the first regulating part 43 in the axial direction of the through hole 41a can be adjusted through the first threaded connection structure S1 between the first regulating part 43 and the sealing head 42, and the position of the second regulating part 44 in the axial direction of the through hole 41a can be adjusted through the second threaded connection structure S2 between the second regulating part 44 and the first regulating part 43.

It is apparent that the first threaded connection structure S1 includes a first internal threaded portion provided on an inner peripheral wall of the sealing head 42 and a first external threaded portion provided on an outer peripheral wall of the first regulating part 43, and the second threaded connection structure S2 includes a second internal threaded portion provided on an inner peripheral wall of the first regulating part 43 and a second external threaded portion provided on an outer peripheral wall of the second regulating part 44.

In practical application, when the coil part 40 is energized, the movable iron core 47 drives the valve rod 48 to move toward the static iron core 46, that is, to move downward, under the action of electromagnetic force. The downward stroke of the valve rod 48 can be controlled by rotating the first regulating part 43, to control the compression force of the elastic part 49, so that the maximum outlet pressure can be effectively set. When the coil part 40 is powered off, the movable iron core 47 and the valve rod 48, under the action of the elastic force of the elastic part 49, move away from the static iron core 46, that is, move upward. The upward stroke of the valve rod 48 can be controlled by rotating the second regulating part 44, so that the minimum outlet pressure can be effectively set, and thus a pressure regulating range is formed after setting the minimum and maximum pressure.

Apparently, after regulation is performed by the first regulating part 43 and the second regulating part 44, it is necessary to define their positions, so as to avoid that the positions of the first regulating part 43 and the second regulating part 44 change due to the impact of vibration during subsequent transportation or use of the valve, which will affect the accuracy of the pressure regulating range.

The gas valve according to the present application is further provided with a damping part 50. The damping part 50 is arranged in the first threaded connection structure S1 between the first regulating part 43 and the sealing head 42. The damping part 50 is connected to one of the first regulating part 43 and the sealing head 42, and an outer peripheral portion of the damping part 50 abuts against one of the first internal threaded portion and the first external threaded portion, so that a damping is formed between the first threaded connection structure S1 between the first regulating part 43 and the sealing head 42 through the damping part 50; and/or, the damping part 50 is arranged in the second threaded connection structure S2 between the first regulating part 43 and the second regulating part 44. The damping part 50 is connected to one of the first regulating part 43 and the second regulating part 44, and an outer peripheral portion of the damping part 50 abuts against one of the second internal threaded portion and the second external threaded portion, so that a damping is formed between the second threaded connection structure S2 between the first regulating part 43 and the second regulating part 44 through the damping part 50.

In this way, under action of the damping provided by the damping part 50, the connection structure between the pressure regulating parts of the gas valve is limited by the damping and thus cannot be easily loosened, and the position of the first regulating part 43 and/or the second regulating part 44 can be more accurately defined, thereby realizing a good loosening prevention effect. Additionally, the pressure regulating range of the gas valve can be well determined, and the possibility that the pressure regulating range changes due to the position change of the related regulating parts can be reduced.

The damping part 50 forming damping both between the first threaded connection structure S1 and between the second threaded connection structure S2 is described as an example. Of course, in the practical setting, it is possible to form damping only between the first threaded connection structure S1 or only between the second threaded connection structure S2.

Specifically, the damping part 50 includes a first damping portion, and at least a part of the first damping portion is located between the inner peripheral wall of the sealing head 42 and the outer peripheral wall of the first regulating part 43. The first threaded connection structure S1 is configured to squeeze a part, between the inner peripheral wall of the sealing head 42 and the outer peripheral wall of the first regulating part, of the first damping portion by rotation of the first regulating part 43, to form damping. After the rotating external force applied to the first regulating part 43 disappears, the first regulating part 43 is prevented from loosening due to the self-friction force generated by the aforementioned formed damping, thereby defining the position of the first regulating part 43.

More specifically, a set space for movement of the part, between the inner peripheral wall of the sealing head 42 and the outer peripheral wall of the first regulating part 43, of the first damping portion is provided in the circumferential direction of the first regulating part 43, to prevent the threaded structure between the first regulating part 43 and the sealing head 42 from being stuck. That is, while forming the damping, the part, between the sealing head 42 and the first regulating part 43, of the first damping portion cannot stuck the threaded structure, which result in the first regulating part 43 being unable to be adjusted.

Specifically, the damping part 50 includes a second damping portion, and at least a part of the second damping portion is located between the inner peripheral wall of the first regulating part 43 and the outer peripheral wall of the second regulating part 44. The second threaded connection structure S2 is configured to squeeze the part, between the inner peripheral wall of the first regulating part 43 and the outer peripheral wall of the second regulating part 44, of the second damping portion by rotation of the second regulating part 44, to form the damping. After the external rotating force applied to the second regulating part 44 disappears, the second regulating part 44 is prevented from loosening due to the self-friction generated by the aforementioned formed damping, thereby defining the position of the second regulating part 44.

More specifically, a set space for movement of the part, between the inner peripheral wall of the first regulating part 43 and the outer peripheral wall of the second regulating part 44, of the second damping part is provided in the circumferential direction of the second regulating part 44, to prevent the threaded structure between the first regulating part 43 and the second regulating part 44 from being stuck. That is, while forming the damping, the part, between the second regulating part 44 and the first regulating part 43, of the second damping portion cannot stuck the threaded structure, which result in the second regulating part 44 being unable to be adjusted.

Figure 3:
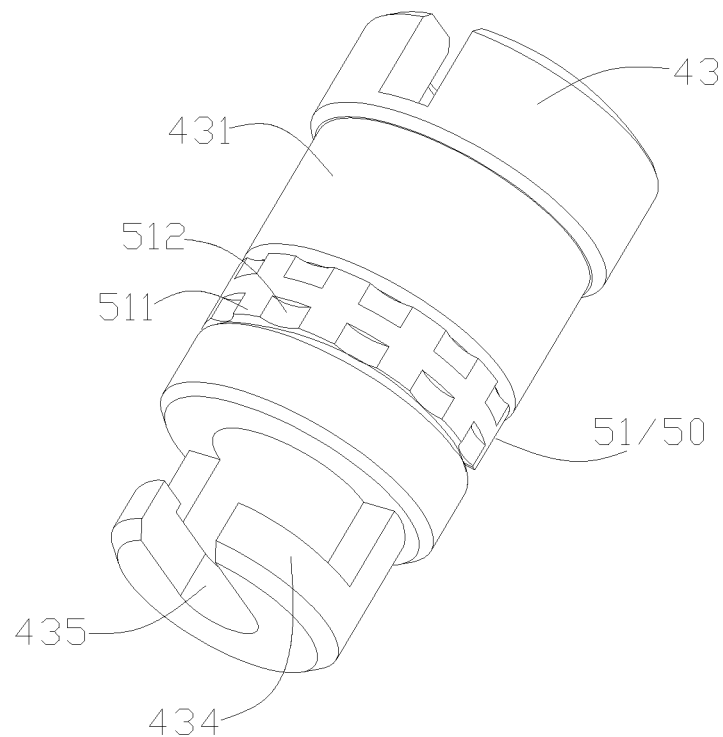
FIG. 3 is a schematic structural view of a first regulating part and a damping part in FIG. 2 in an assembled state.
Figure 4:
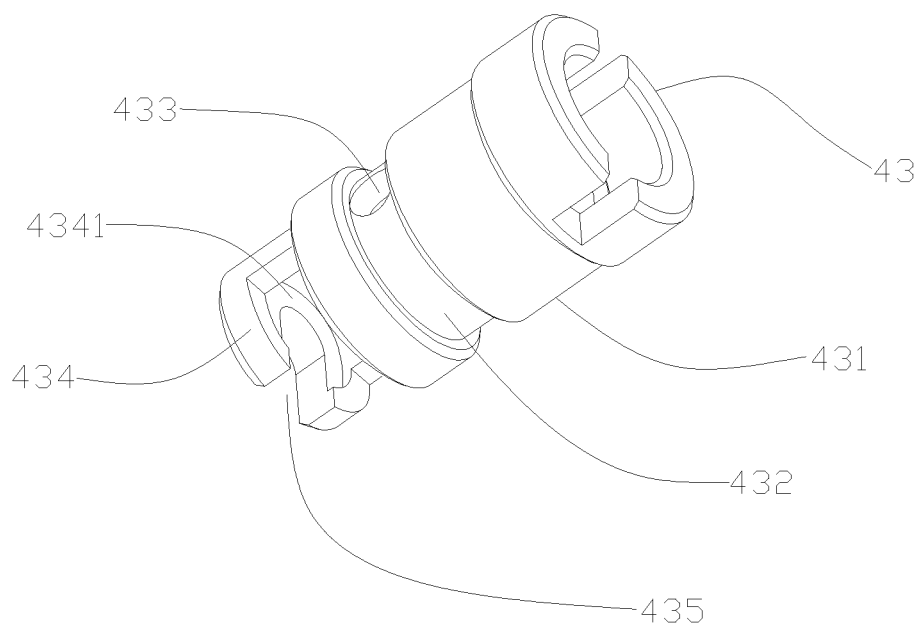
FIG. 4 is a schematic structural view of the first regulating part shown in FIG. 3.

With reference to FIG. 3 to FIG. 6 together, FIG. 3 is a schematic structural view of the first regulating part and the damping part in FIG. 2 in an assembled state, FIG. 4 is a schematic structural view of the first regulating part shown in FIG. 3, FIG. 5 is a schematic structural view of the damping part shown in FIG. 3, and FIG. 6 is a schematic structural view of the damping part shown in FIG. 5 from another perspective.

In this embodiment, the first regulating part 43 includes a tube body portion 431, the first external threaded portion in threaded engagement with the sealing head 42 is provided on an outer peripheral wall of the tube body portion 431, and a lower end of the tube body portion 431 is connected with the above limiting portion 434. There is a set space between the limiting portion 434 and a lower end face of the tube body portion 431 to reserve a space for movement for an upper end portion of the valve rod 48. The limiting portion 434 is provided with an opening 435, and the upper end portion of the valve rod 48 cooperates with the limiting portion 434 after being inserted through the opening 435. A limiting stepped face 481 of the valve rod 48 can abut against and cooperate with the limiting face portion 4341 of the limiting portion 434, so that the valve rod 48 will not disengage from the limiting portion 434.

The outer peripheral wall of the tube body portion 431 of the first regulating part 43 has a groove portion 432.

In this embodiment, the damping part 50 includes a first main body member 51 which is arranged in the groove portion 432 and is fixed to the tube body portion 431. The first main body member 51 includes at least one convex portion 511 which at least partially protrudes from the outer peripheral wall of the tube body portion 431. Thus, when the first regulating part 43 is rotated, external threads of the tube body portion 431 engage with internal threads of the sealing head 42, and the part, protruding from the outer peripheral wall of the tube body portion 431, of the convex portion 511 will be squeezed, and a tightening force, that is, a damping, will be formed. It can be understood that in this case, the foregoing first damping portion includes the convex portion 511.

Specifically, the first main body member 51 is of an arc-shaped structure, and the groove portion 432 extends along a circumferential direction of the tube body portion 431 to be adapted to the first main body member 51. The first main body member 51 is provided with at least one convex portion 511 and at least one concave portion 512 along a circumferential direction of the first main body member 51. The convex portion 511 and the concave portion 512 are arranged adjacent to each other. In this way, the threaded connection structure between the sealing head 42 and the first regulating part 43 is configured to push each of the at least one convex portion 511 to a corresponding one, adjacent to the convex portion, of the at least one concave portion 512 by rotation of the first regulating part 43, so as to avoid the threaded structure being stuck, and resulting in the position of the first regulating part 43 being unable to be adjusted. It can be understood that in this case, the above first damping portion includes the convex portion 511 and the concave portion 512.

As shown in FIG. 5 and FIG. 6, in this embodiment, a radian of the first main body member 51 is greater than 180 degrees, and multiple convex portions 511 and multiple concave portions 512 may be arranged along the circumferential direction of the first main body member 51. One concave portion 512 is arranged between two adjacent convex portions 511. Specifically, the outline of the concave portion 512 may be in an arc-shaped structure, which is convenient for the convex portion 511 to move to the concave portion 512 when being squeezed.

In the embodiment shown in FIG. 5 and FIG. 6, two layers of concave-convex structures are arranged in the axial direction of the first main body member 51, and the convex portions 511 at an upper layer and a lower layer are correspondingly arranged, and the concave portions 512 at the upper layer and the lower layer are correspondingly arranged. It can be understood that in the practical setting, the specific shapes, numbers and arrangement of the convex portions 511 and the concave portions 512 are not limited to those shown in the drawings, as long as a damping can be formed between the first regulating part 43 and the sealing head 42 while ensuring the reliability of action of the first threaded connection structure 51.

Specifically, the first main body member 51 may be squeezed into the groove portion 432 in an interference manner, and the first main body member 51 and the tube body portion 431 may be relatively fixed to each other by interference press-fitting. However, the first main body member 51 and the tube body portion 431 may also be relatively fixed to each other in other manners.

In order to define the relative position of the first main body member 51 and the tube body portion 431 more reliably, at least one hole portion 433 may be arranged at a bottom of the groove portion 432 of the tube body portion 431, and the hole portion 433 extends through a groove bottom wall of the groove portion 432. The damping part 50 further includes at least one boss 513, which is fixedly arranged on the first main body member 51. When being assembled, the boss 513 is embedded in the hole portion 433, and the reliability of relative fixation between the first main body member 51 and the tube body portion 431 can be improved by the limiting function between the boss 513 and the hole portion 433.

In actual setting, the hole portion 433 may be in the form of a blind hole or a through hole. In a case of the hole portion 433 being in the form of the through hole, the hole portion 433 also extends through an inner peripheral wall of the tube body portion 431, and the inner peripheral wall of the tube body portion 431 is provided with internal threads in threaded engagement with the second regulating part 44.

On the basis that the hole portion 433 is in the form of the through hole, the boss 513 may be configured in the following forms: after the boss 513 is embedded in the hole portion 433, the boss 513 protrudes from the inner peripheral wall of the tube body portion 431. In this way, when the second regulating part 44 is rotated, external threads of the second regulating part 44 engage with the internal threads of the tube body portion 431, and the part, protruding from the inner peripheral wall of the tube body portion 431, of the boss 513 will be squeezed, forming a clamping force, that is, damping. It can be understood that in this case, the above second damping portion includes the boss 513.

In the embodiment shown in FIG. 5 and FIG. 6, the radian of the first main body member 51 is greater than 180 degrees. Two bosses 513 are fixedly arranged on the first main body member 51. The two bosses 513 is located at two ends of the first main body member 51, respectively. Correspondingly, the groove portion 432 of the tube body portion 431 is provided with two corresponding hole portions 433.

In actual setting, each of the two hole portions 433 is in the form of the through hole, and each of the two bosses 513 protrudes from the inner peripheral wall of the tube body portion 431.

Of course, in actual setting, other numbers of bosses 513 may be provided on the first main body member 51. All of the bosses 513 may protrude from the inner peripheral wall of the tube body portion 431 to form damping between the second regulating part 44 and the first regulating part 43, or part of the bosses 513 may protrude from the inner peripheral wall of the tube body portion 431 to form damping between the second regulating part 44 and the first regulating part 43.

With reference to FIG. 7 and FIG. 8 together, FIG. 7 is a schematic structural view of a damping part according to another embodiment of the present application, and FIG. 8 is a schematic structural view of the damping part shown in FIG. 7 from another perspective.

As shown in FIG. 7 and FIG. 8, the damping part 50 includes a first main body member 51', the first main body member 51' is also of an arc-shaped structure, and an outer peripheral wall of the first main body member 51' is also provided with a convex portion 511 and a concave portion 512. Compared to the aforementioned damping part 50, a radian of the first main body member 51' of the damping part 50 is less than 180 degrees, and only one boss 513 is fixedly arranged on the first main body member 51', and the boss 513 is located at a middle position of the first main body member 51'.

In actual setting, the tube body portion 431 of the first regulating part 43 is provided with a groove portion 432, a shape of which matches with that of the first main body member 51', and a hole portion 433 is also provided on a groove bottom wall of the groove portion 432 to match the boss 513 on the first main body member 51'. Similarly, the hole portion 433 may be configured in the form of a through hole, and the boss 513, after being embedded in the hole portion 433, protrudes from an inner wall of the tube body portion 431 to form a second damping portion.

According to actual needs, multiple first main body members 51' may be provided, and each of the first main body members 51' may be provided at different axial positions on the tube body portion 431.

Figure 9:
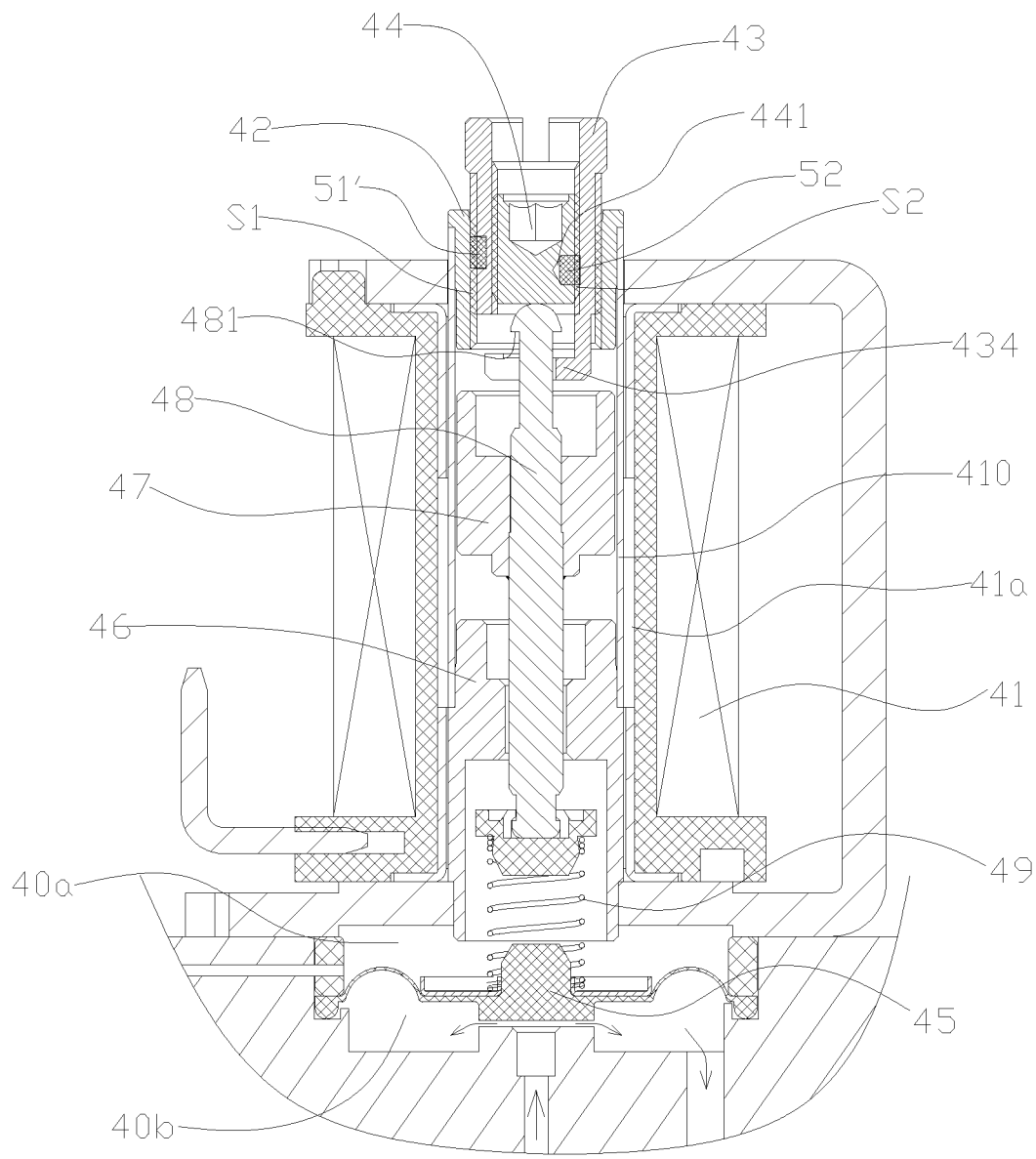
FIG. 9 is a partially enlarged view of a gas valve at a position of an electromagnetic control device according to another embodiment of the present application.
Figure 10:
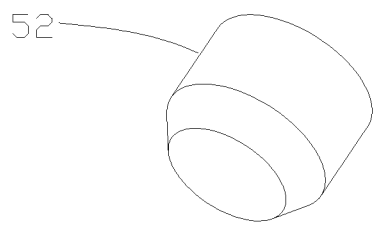
FIG. 10 is a schematic structural view of a second main body member of a damping part according to an embodiment of the present application.

In addition to the above arrangement, the second damping portion may be arranged in other forms. With reference to FIG. 9 and FIG. 10 together, FIG. 9 is a partially enlarged view of a gas valve at a position of an electromagnetic control device according to another embodiment of the present application, and FIG. 10 is a schematic structural view of a second main body member of a damping part according to an embodiment of the present application.

In this embodiment, the damping part 50 includes the above first main body member 51' shown in FIG. 7 and FIG. 8 and a second main body member 52, and the second main body member 52 and the first main body member 51' are separately arranged.

In the embodiment shown in FIG. 9, the boss 513 of the first main body member 51' is configured to not pass through the inner peripheral wall of the tube body portion 431, that is, the first main body member 51' only provides damping between the first regulating part 43 and the sealing head 42.

As shown in FIG. 9, the outer peripheral wall of the second regulating part 44 is provided with a mounting cavity portion 441, and the second main body member 52 is fixedly embedded in the mounting cavity portion 441 and protrudes from the outer peripheral wall of the second regulating part 44. In this way, when the second regulating part 44 is rotated, external threads of the second regulating part 44 engage with internal threads of the tube body portion 431, and a part, protruding from the outer peripheral wall of the second regulating part 44, of the second main body member 52 will be squeezed to form a tightening force, that is, damping. It can be understood that in this case, the above second damping portion includes the second main body member 52.

Of course, in actual setting, the mounting cavity portion may be provided on the inner peripheral wall of the tube body portion 431 of the first regulating part 43. The second main body member 52 may be fixedly embedded in the mounting cavity portion of the tube body portion 431 and protrudes from the inner peripheral wall of the tube body portion 431. In this way, a damping can also be formed between the second regulating part 44 and the first regulating part 43.

It should be noted here that the above embodiments may be combined with each other as long as there is no conflict. For example, on the basis of the embodiment shown in FIG. 9, the boss 513 of the first main body member 51' may also be configured to protrude from the inner peripheral wall of the tube body portion 431, that is, the hole portion 433 of the tube body portion 431 is configured in the form of a through hole. In this way, the part, protruding from the inner peripheral wall of the tube body portion 431, of the boss 513 forms damping between the tube body portion 431 and the second regulating part 44, so that the second damping portion includes the second main body member 52 and the boss 513.

Of course, on the basis of the embodiment shown in FIG. 2, that is, on the basis of provision of the first main body member 51, the second main body member 52 may further be provided, which will not be repeated here.

In the specific setting, the second main body member 52 may be of a substantially cylindrical structure, which is convenient for processing related structures.

Figure 11:
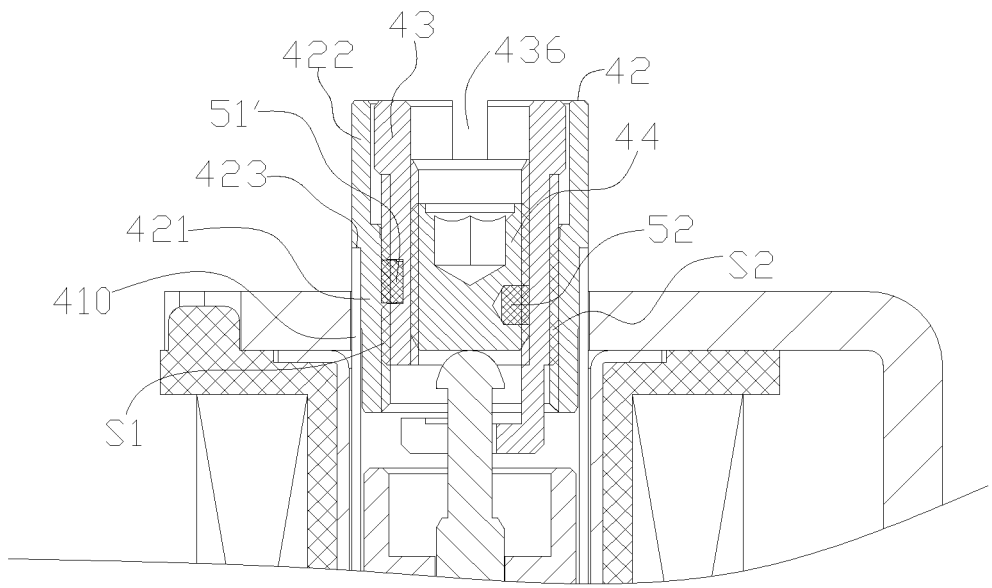
FIG. 11 is a schematic partial sectional view of an electromagnetic control device according to another embodiment of the present application.

With reference to FIG. 11, FIG. 11 is a schematic partial sectional view of an electromagnetic control device according to another embodiment of the present application.

In the embodiment shown in FIG. 11, the structure of the sealing head 42 is mainly improved, and the structure of the damping part 50 including the first main body member 51' and the second main body member 52 is schematically shown in FIG. 11. It can be understood that the damping part 50 is not limited to that shown in the figure on the basis that the sealing head 42 adopts the structure in this embodiment.

In this embodiment, the sealing head 42 includes a sealing head main body portion 421 and a jacket portion 422. An outer diameter of the sealing head main body portion 421 is smaller than that of the jacket portion 422, and a downward stepped face 423 is formed at a joint of the sealing head main body portion 421 and the jacket portion 422. After being assembled, the sealing head main body portion 421 is located in the sleeve 410 and is fixed to the sleeve 410, and the stepped face 423 abuts against an end surface of the sleeve 410 to define the positions of the sleeve 410 and the sealing head 42 in the axial direction The first regulating part 43 includes a regulating head 436 for rotary regulation, and the regulating head 436 is generally provided with an opening structure, which may be a straight-line opening or the like, fitted with a rotating fixture. After being assembled, the regulating head 436 is located in the jacket portion 422 of the sealing head 42. With this arrangement, when the first regulating part 43 is rotated for regulating in a high-pressure state, the position of the regulating fixture can be limited to avoid accidental damage caused by sliding of the regulating fixture, and the regulation can be more convenient and reliable.

Figure 12:
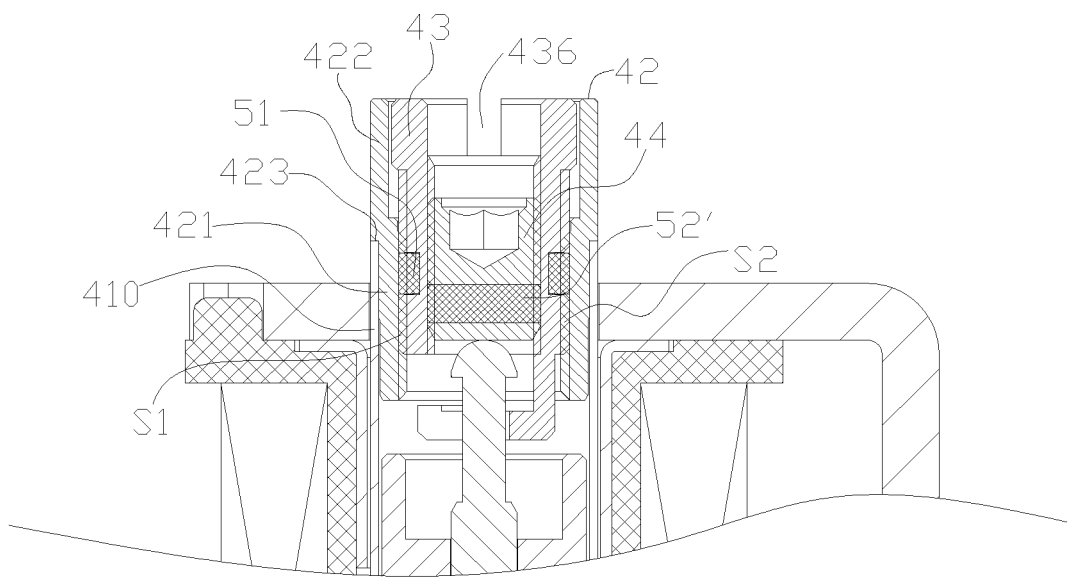
FIG. 12 is a schematic partial sectional view of an electromagnetic control device according to yet another embodiment of the present application.

With reference to FIG. 12, FIG. 12 is a schematic partial sectional view of an electromagnetic control device according to yet another embodiment of the present application.

In this embodiment, the structure of the sealing head 42 is as same as that shown in FIG. 11, which will not be repeated. A damping part 50 includes a first main body member 51 and a second main body member 52'.

The first main body member 51 is similar to that shown in FIG. 5 and FIG. 6. The first main body member 51 is fixed on the first regulating part 43. On the groove portion 432 of the tube body portion 431 of the first regulating part 43, the boss 513 of the first main body member 51 is embedded in the hole portion 433 of the groove portion 432. The difference from the embodiment shown in FIG. 2 is that in the example shown in FIG. 12, the hole portion 433 of the groove portion 432 is in a form of a blind hole, that is, the first main body member 51 is only used to form damping between the first regulating part 43 and the sealing head 42.

In the example shown in FIG. 12, a peripheral wall of the second regulating part 44 is provided with a through-hole portion, which includes two through-hole structures arranged along a radial direction of the second regulating part 44. The second main body member 52' is located in the through-hole portion and is fixed to the second regulating part 44. Each of two ends of the second main body member 52' passes through a corresponding through-hole structure and abuts against the second internal threaded portion of the first regulating part 43, that is, the second damping portion includes a part, passing through the through-hole structure, of the second main body member 52', and the part is used to form damping between the first regulating part 43 and the second regulating part 44.

Specifically, the second main body member 52' may be fixed to the second regulating part 44 in a press-fit manner.

Figure 13:
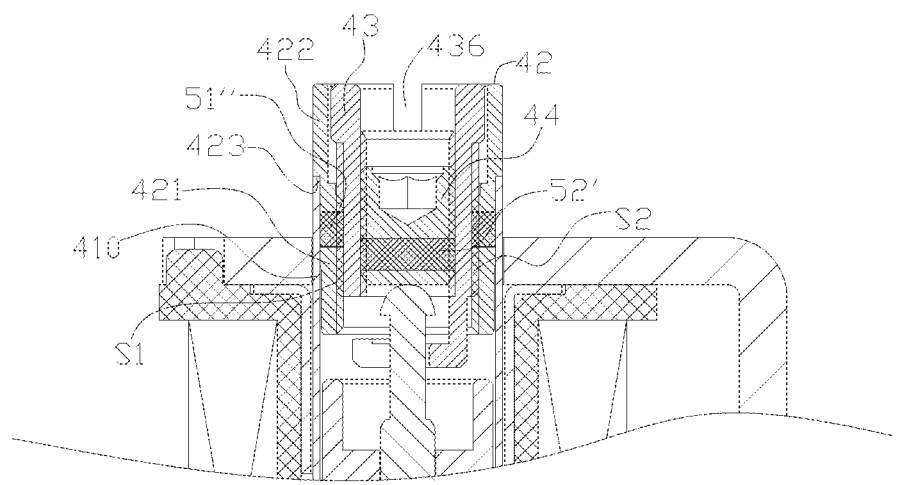
FIG. 13 is a schematic partial sectional view of an electromagnetic control device according to still yet another embodiment of the present application.
Figure 14:
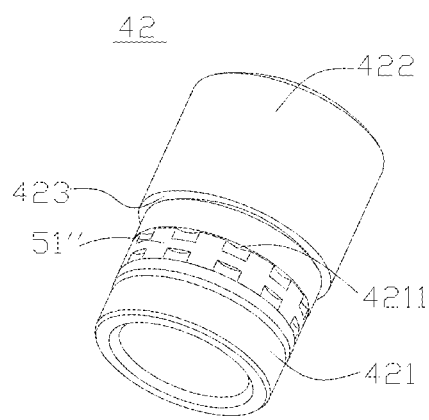
FIG. 14 is a schematic structural view of a sealing head in FIG. 13.
Figure 15:
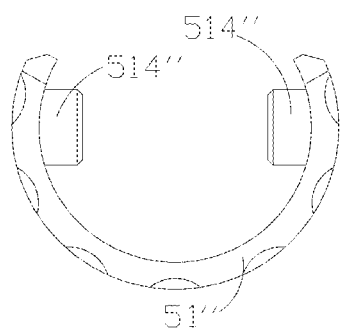
FIG. 15 is a schematic structural view of a first main body member in FIG. 14.

With reference to FIG. 13 to FIG. 15 together, FIG. 13 is a schematic partial sectional view of an electromagnetic control device according to still yet another embodiment of the present application, FIG. 14 is a schematic structural view of the sealing head in FIG. 13, and FIG. 15 is a schematic structural view of the first main body member in FIG. 14.

In the example shown in FIG. 13, the structure of the sealing head 42 is as same as that shown in FIG. 11 and FIG. 12, and the damping part 50 includes a first main body member 51" and a second main body member 52'. The structure and assembly of the second main body member 52' are as same as those shown in FIG. 12, and will not be repeated here.

In this embodiment, the first main body member 51" is not fixed on the first regulating part 43, but fixed on the sealing head 42. Specifically, the sealing head main body portion 421 of the sealing head 42 is provided with a mounting groove portion 4211, and the first main body member 51" is arranged on the mounting groove portion 4211 and is fixed to the sealing head main body portion 421. At least one protrusion portion 514" is fixedly arranged on the main body member 51". A groove bottom wall of the mounting groove portion 4211 is provided with a through hole fitted with the protrusion portion 514", and the protrusion portion 514" passes through a corresponding through hole and abuts against the first external threaded portion of the first regulating part 43. In this case, the above first damping portion includes the protrusion portion 514".

In the illustrated embodiment, the first main body member 51" is of an arc-shaped structure with a radian greater than 180 degrees, and each of two ends of the first main body member 51" is fixedly provided with one protrusion portion 514". It can be understood that the radian of the first main body member 51" may be set smaller in actual setting, similar to the structures shown in FIG. 7 and FIG. 8. The first main body member 51" may be squeezed in the mounting groove portion 4211 in an interference press-fit manner.

It should be noted that although the structure of the first main body member 51" in this embodiment is similar to that shown in FIG. 5 and FIG. 6 in shape, the structure and position for damping are different due to different assembly positions of the first main body member 51".

In this embodiment, the outer peripheral wall of the first main body member 51" is fitted with the sleeve 410, and in the specific setting, the concave-convex structure may still be provided as that in FIG. 5 and FIG. 6, so as to fix the sealing head 42 and the sleeve 410 to each other by press-fitting.

In the specific embodiment, the damping parts 50 in the above embodiments are all made of plastic parts, which is convenient to form damping through the squeezing of related threaded connection structures.

The electromagnetic control device and the gas valve with the electromagnetic control device according to the present application are described in detail above. The principle and embodiments of the present application are described through specific examples herein. The above embodiments are merely described to facilitate understanding the method and core idea of the present application. It should be noted that, for those skilled in the art, many improvements and modifications may be further made to the present application without departing from the principle of the present application, and these improvements and modifications also fall within the protection scope of claims of the present application.

The invention claimed is:

1. An electromagnetic control device, comprising a sealing head, a sleeve, a first regulating part and a second regulating part, wherein the sealing head is fixedly connected with the sleeve, a part of the sealing head is located inside the sleeve; the sealing head comprises a first internal threaded portion, and the first regulating part comprises a first external threaded portion, wherein the first internal threaded portion is in threaded engagement with the first external threaded portion; the first regulating part further comprises a second internal threaded portion, the second regulating part comprises a second external threaded portion, and the second internal threaded portion is in threaded engagement with the second external threaded portion; wherein the electromagnetic control device further comprises a damping part, wherein the damping part is arranged in a threaded connection structure between the first regulating part and the sealing head, the damping part is connected to one of the first regulating part and the sealing head, and an outer peripheral portion of the damping part abuts against one of the first internal threaded portion and the first external threaded portion; and/or the damping part is arranged in a threaded connection structure between the first regulating part and the second regulating part, wherein the damping part is connected to one of the first regulating part and the second regulating part, and the outer peripheral portion of the damping part abuts against one of the second internal threaded portion and the second external threaded portion.

2. The electromagnetic control device according to claim 1, wherein the damping part comprises a first damping portion, and at least a part of the first damping portion is located between an inner peripheral wall of the sealing head and an outer peripheral wall of the first regulating part; and the threaded connection structure between the first regulating part and the sealing head is configured to squeeze a part, between the inner peripheral wall of the sealing head and the outer peripheral wall of the first regulating part, of the first damping portion by rotation of the first regulating part, to form damping; and/or the damping part comprises a second damping portion, and at least a part of the second damping portion is located between an inner peripheral wall of the first regulating part and an outer peripheral wall of the second regulating part; and the threaded connection structure between the second regulating part and the first regulating part is configured to squeeze a part, between the inner peripheral wall of the first regulating part and the outer peripheral wall of the second regulating part, of the second damping portion by rotation of the second regulating part, to form damping.

3. The electromagnetic control device according to claim 2, wherein a set space for movement of the part, between the inner peripheral wall of the sealing head and the outer peripheral wall of the first regulating part, of the first damping portion is provided in a circumferential direction of the first regulating part, to prevent the threaded connection structure between the first regulating part and the sealing head from being stuck; and/or
- a set space for movement of the part, between the inner peripheral wall of the first regulating part and the outer peripheral wall of the second regulating part, of the second damping portion is provided in a circumferential direction of the second regulating part, to prevent the threaded connection structure between the first regulating part and the second regulating part from being stuck.

4. The electromagnetic control device according to claim 3, wherein the first regulating part comprises a tube body portion, the first external threaded portion in threaded engagement with the sealing head is provided on an outer peripheral wall of the tube body portion, and the outer peripheral wall of the tube body portion is provided with a groove portion; the damping part comprises at least one first main body member, the first main body member is arranged in the groove portion and is fixed to the tube body portion; the first main body member comprises at least one convex portion, and the convex portion at least partially protrudes from the outer peripheral wall of the tube body portion; and the first damping portion comprises the convex portion.

5. The electromagnetic control device according to claim 4, wherein the first main body member is of an arc-shaped structure, and the groove portion extends along a circumferential direction of the tube body portion; the first main body member is provided with at least one convex portion and at least one concave portion along a circumferential direction of the first main body member, wherein the convex portion and the concave portion are arranged adjacent to each other; the threaded connection structure between the sealing head and the first regulating part is configured to push each of the at least one convex portion to a corresponding one, adjacent to the convex portion, of the at least one concave portion by rotation of the first regulating part; and the first damping portion comprises the convex portion and the concave portion.

6. The electromagnetic control device according to claim 5, wherein a bottom of the groove portion of the tube body portion is provided with at least one hole portion extending through a bottom wall of the groove portion; and the damping part further comprises at least one boss, and the at least one boss is fixedly arranged on an inner wall of the first main body member and embedded in the hole portion.

7. The electromagnetic control device according to claim 6, wherein the hole portion is in a form of a through hole, the hole portion further extends through an inner peripheral wall of the tube body portion, the at least one boss protrudes from the inner peripheral wall of the tube body portion, the inner peripheral wall of the tube body portion is provided with internal threads in threaded engagement with the second regulating part; and the second damping portion comprises the at least one boss.

8. The electromagnetic control device according to claim 7, wherein a radian of the first main body member is less than 180 degrees, only one boss is fixedly arranged on the first main body member, and the boss is located at a middle position of the first main body member; or
- a radian of the first main body member is greater than 180 degrees, and at least two bosses are fixedly arranged on the first main body member, wherein two of the at least two bosses are arranged at two ends of the first main body member, respectively.

9. The electromagnetic control device according to claim 6, wherein a radian of the first main body member is less than 180 degrees, only one boss is fixedly arranged on the first main body member, and the boss is located at a middle position of the first main body member; or
- a radian of the first main body member is greater than 180 degrees, and at least two bosses are fixedly arranged on the first main body member, wherein two of the at least two bosses are arranged at two ends of the first main body member, respectively.

10. The electromagnetic control device according to claim 5, wherein the damping part further comprises at least one second main body member, and the second main body member is arranged separately from the first main body member;
- the inner peripheral wall of the first regulating part is provided with a first mounting cavity portion, and the second main body member is fixedly embedded in the first mounting cavity portion and protrudes from the inner peripheral wall of the first regulating part; or
- the outer peripheral wall of the second regulating part is provided with a second mounting cavity portion, and the second main body member is fixedly embedded in the second mounting cavity portion and protrudes from the outer peripheral wall of the second regulating part; and
- the second damping portion comprises the second main body member.

11. The electromagnetic control device according to claim 5, wherein the damping part further comprises at least one second main body member, and the second main body member is arranged separately from the first main body member;
- a peripheral wall of the second regulating part is provided with a through-hole portion, the through-hole portion comprises two through-hole structures arranged along a radial direction of the second regulating part; the second main body member is arranged at the through-hole portion and is fixed to the second regulating part; and each of two ends of the second main body member passes through a corresponding one of the two through-hole structures and abuts against the second internal threaded portion.

12. The electromagnetic control device according to claim 4, wherein the damping part further comprises at least one second main body member, and the second main body member is arranged separately from the first main body member;
- the inner peripheral wall of the first regulating part is provided with a first mounting cavity portion, and the second main body member is fixedly embedded in the first mounting cavity portion and protrudes from the inner peripheral wall of the first regulating part; or
- the outer peripheral wall of the second regulating part is provided with a second mounting cavity portion, and the second main body member is fixedly embedded in the second mounting cavity portion and protrudes from the outer peripheral wall of the second regulating part; and
- the second damping portion comprises the second main body member.

13. The electromagnetic control device according to claim 12, wherein the second main body member is of a substantially cylindrical structure.

14. The electromagnetic control device according to claim 4, wherein the damping part further comprises at least one second main body member, and the second main body member is arranged separately from the first main body member;

a peripheral wall of the second regulating part is provided with a through-hole portion, the through-hole portion comprises two through-hole structures arranged along a radial direction of the second regulating part; the second main body member is arranged at the through-hole portion and is fixed to the second regulating part; and each of two ends of the second main body member passes through a corresponding one of the two through-hole structures and abuts against the second internal threaded portion.

15. The electromagnetic control device according to claim 3, wherein the sealing head comprises a sealing head main body portion fixedly inserted into the sleeve, the sealing head main body portion comprises the first internal threaded portion, and an outer peripheral wall of the sealing head main body portion is provided with a mounting groove portion; the damping part comprises at least one first main body member, the first main body member is arranged at the mounting groove portion and is fixed to the sealing head main body portion; wherein at least one protrusion portion is fixedly arranged on the first main body member, a bottom wall of the mounting groove portion is provided with a through hole fitted with the protrusion portion, the protrusion portion passes through the through hole and abuts against the first external threaded portion; and the first damping portion comprises the protrusion portion.

16. The electromagnetic control device according to claim 1, wherein the damping part is a plastic part.

17. The electromagnetic control device according to claim 1, wherein the sealing head comprises a sealing head main body portion and a jacket portion, wherein an outer diameter of the jacket portion is larger than that of the sealing head main body portion; a downward stepped face is formed at a joint of the jacket portion and the sealing head main body portion, and the stepped face abuts against an end surface of the sleeve; and the first regulating part comprises a regulating head for rotary regulation, and the regulating head is located in the jacket portion.

18. A gas valve, comprising the electromagnetic control device according to claim 1.

* * * * *